(12) United States Patent
Paryani et al.

(10) Patent No.: US 10,887,127 B2
(45) Date of Patent: Jan. 5, 2021

(54) CAN LISTEN ONLY CONFIGURATION FOR SAFETY CRITICAL SYSTEMS

(71) Applicant: Faraday & Future Inc., Gardena, CA (US)

(72) Inventors: Anil Paryani, Cerritos, CA (US); Eric Ryan Evenchick, Toronto (CA); Jana Mahen Fernando, Torrance, CA (US)

(73) Assignee: Faraday & Future Inc., Gardena, CA (US)

( * ) Notice: Subject to any disclaimer, the term of this patent is extended or adjusted under 35 U.S.C. 154(b) by 0 days.

(21) Appl. No.: 15/336,599

(22) Filed: Oct. 27, 2016

(65) Prior Publication Data

US 2017/0126428 A1 May 4, 2017

Related U.S. Application Data

(60) Provisional application No. 62/249,153, filed on Oct. 30, 2015, provisional application No. 62/261,086, filed on Nov. 30, 2015.

(51) Int. Cl.
*H04L 12/40* (2006.01)
*G05B 15/02* (2006.01)
*G06F 13/42* (2006.01)

(52) U.S. Cl.
CPC ........ *H04L 12/40078* (2013.01); *G05B 15/02* (2013.01); *G06F 13/4282* (2013.01); *H04L 12/40013* (2013.01); *H04L 2012/40215* (2013.01); *H04L 2012/40273* (2013.01)

(58) Field of Classification Search
CPC ....................................... H04B 1/40
See application file for complete search history.

(56) References Cited

U.S. PATENT DOCUMENTS

| 6,954,893 | B2 * | 10/2005 | Temullo | G06F 11/10 714/807 |
| 7,480,251 | B2 * | 1/2009 | Foschiano | H04L 45/02 370/248 |
| 9,471,528 | B2 * | 10/2016 | Muth | G06F 13/4072 |
| 2004/0057179 | A1 * | 3/2004 | Galang | H02H 3/207 361/90 |
| 2016/0294725 | A1 * | 10/2016 | Maise | H04L 12/40202 |

* cited by examiner

*Primary Examiner* — Henry Tsai
*Assistant Examiner* — Juanito Borromeo
(74) *Attorney, Agent, or Firm* — Knobbe Martens Olson & Bear LLP

(57) ABSTRACT

Systems and methods for communication between a vehicle system and a secure communication bus are disclosed. Systems can include a microcontroller and a transceiver configured to send transmit data to the communication bus, receive data from the communication bus, and send data received from the communication bus to the microcontroller. The microcontroller may be prevented from transmitting data to the transceiver by hardware separation between an output of the microcontroller and the transmit data input of the transceiver. The communication bus may be a CAN bus.

20 Claims, 2 Drawing Sheets

CAN LISTEN ONLY CONFIGURATION FOR SAFETY CRITICAL SYSTEMS

RELATED APPLICATIONS

This application claims the benefit of U.S. Provisional Application Ser. No. 62/249,153, filed on Oct. 30, 2015, entitled "LISTEN ONLY CONFIGURATION FOR ENGINE CONTROL UNITS," and U.S. Provisional Application Ser. No. 62/261,086, filed Nov. 30, 2015, entitled "CAN LISTEN ONLY CONFIGURATION FOR SAFETY CRITIAL SYSTEMS," which are hereby incorporated by reference in their entirety and for all purposes.

BACKGROUND

Field

This disclosure relates to automotive communication, and more specifically to systems and methods for securing a communications bus from unsecured vehicle systems.

Description of the Related Art

A controller area network (CAN bus) is frequently used for communication between various vehicle systems within a vehicle, such as engine control units (ECUs). Each system connected with the CAN bus generally is able to transmit data onto the CAN bus and receives data that has been transmitted on the CAN bus by other connected systems. CAN bus communications are thus susceptible to several types of disruption. A corrupted vehicle system may "spam" the CAN bus with heavy traffic of unnecessary or invalid messages, preventing valid messages from being transmitted. In some cases, a corrupted vehicle system may send messages that "spoof" valid messages, thereby causing unintended operation by other vehicle systems receiving the messages. Such disruptions may occur in the case of vehicle system malfunction, or may alternatively be the result of intentional hacking or sabotage so as to disrupt the normal operation of vehicle systems connected to the CAN bus.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one embodiment, a system for communication between a vehicle system and a secure communication bus is described. The system may include a microcontroller and a transceiver configured to send transmit data to the communication bus, receive data from the communication bus, and send data received from the communication bus to the microcontroller. The microcontroller may be prevented from transmitting data to the transceiver by a hardware separation between an output of the microcontroller and the transmit data input of the transceiver.

In another embodiment, a method for communication between a vehicle system and a secure communication bus is described. The method may include providing a microcontroller and providing a transceiver configured to send transmit data to the communication bus, receive data from the communication bus, and send data received from the communication bus to the microcontroller. The method may further include separating, via hardware, the transmit data input of the transceiver from an output of the microcontroller to prevent the microcontroller from transmitting data to the transceiver.

In another embodiment, a vehicle is described. The vehicle may include a secure CAN bus and a plurality of CAN nodes. Each CAN node may include a microcontroller and a transceiver configured to communicate with the microcontroller. At least one of the plurality of CAN nodes may include hardware separation between an output of the microcontroller and the transmit data input of the transceiver.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations are merely examples and are not intended to be limiting. Throughout the drawings, similar symbols typically identify similar components, unless context dictates otherwise.

DETAILED DESCRIPTION

The following description is directed to certain implementations for the purpose of describing the innovative aspects of this disclosure. However, a person having ordinary skill in the art will readily recognize that the teachings herein can be applied in a multitude of different ways. The described implementations may be implemented in conjunction with any communications bus for communication between vehicle systems.

Figure 1:
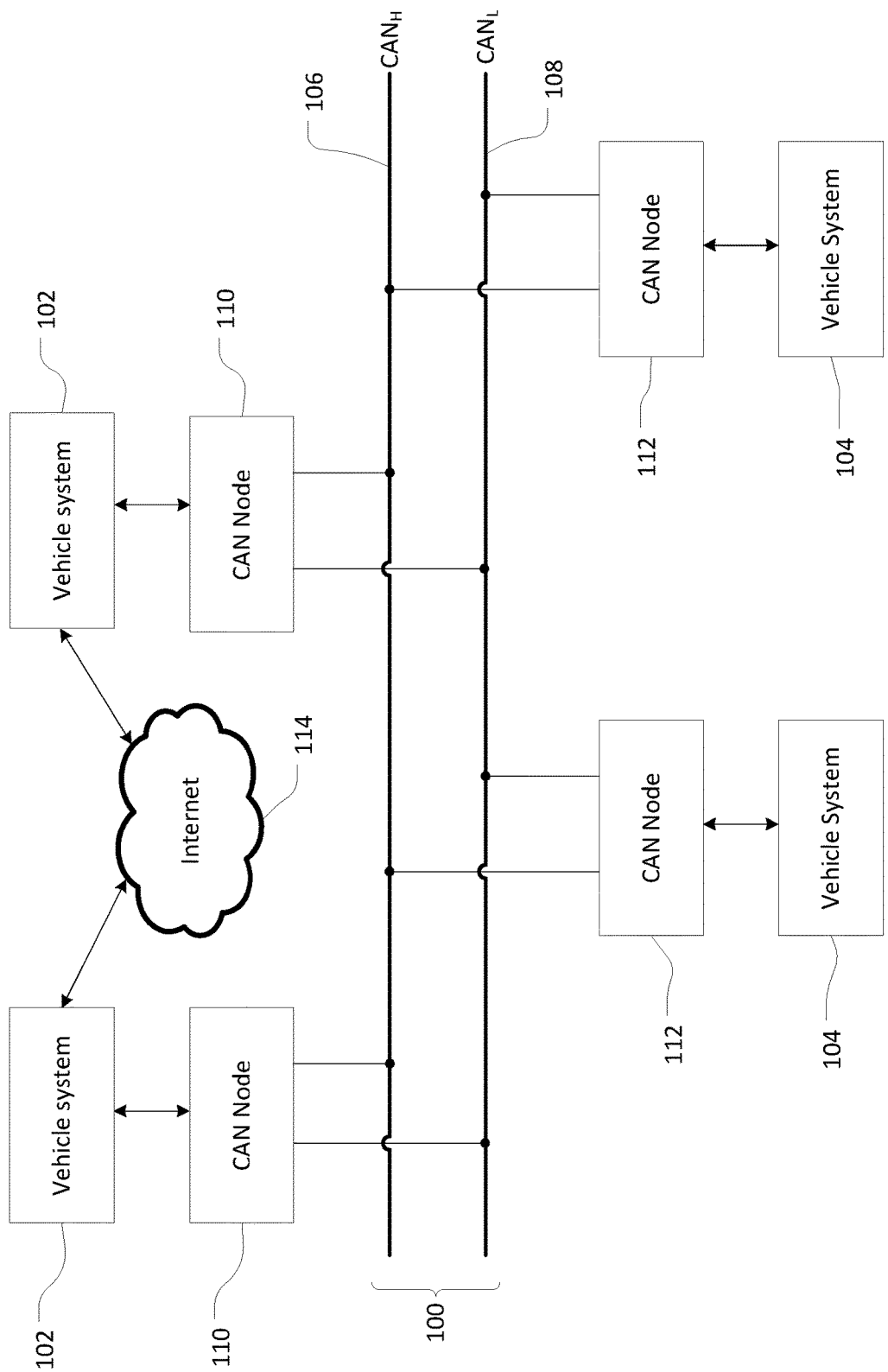
FIG. 1 is a block diagram depicting a CAN bus and its connections to various vehicle systems in accordance with an exemplary embodiment.

FIG. 1 is a block diagram depicting a CAN bus 100 and its connections to various vehicle systems 102, 104 in accordance with an exemplary embodiment. CAN is a well-known system for vehicle communications and is commonly employed in various commercially available vehicles. Generally, a CAN bus 100 transmits data between various vehicle systems 102, 104 through differential signaling, using a high-voltage line 106 and a low-voltage line 108 as a differential pair. Data may be transmitted to and received by vehicle systems 102, 104 via a CAN node 110, 112. As will be discussed in greater detail below with reference to FIG. 2, a CAN node may include circuitry including a transceiver configured to transmit messages from a vehicle system 102, 104 to the CAN bus 100 and send messages received from the CAN bus 100 to a vehicle system 102, 104.

Any number of vehicle systems 102, 104 may communicate with a CAN bus 100. In some embodiments, ECUs may communicate through one or more CAN buses. In electric vehicles, a CAN bus may carry communications to and from high-voltage or other battery control systems. In some embodiments, a vehicle transmission, motor controller, power inverter, airbag control system, antilock brake system, cruise control, power steering, power windows, doors, audio systems, or any other system of a vehicle utilizing electronic communications may communicate via a CAN bus 100. Some vehicle systems 102 connected to at least one CAN bus may also be connected to the internet 114. For example, in some embodiments, a telematics unit, integrated GPS, navigation system, remote diagnostics system, in-vehicle security system, infotainment system, or any other module of a car involving wireless connectivity or data transmission may be connected to the internet. A vehicle system 102 may connect to the internet 114 or any other network via any one or a combination of protocols such as GSM, GPRS, WLAN, Wi-Fi, Li-Fi, LTE, cellular network, Bluetooth, or the like.

A connection to the internet 114 or any other network may threaten the security of communications within a vehicle by providing an access point through which others may access and possibly alter or hack into vehicle systems 102 remotely. In some aspects, a vehicle system 102 may be altered in a way that affects its ordinary course of CAN bus transmissions. Undesired CAN bus transmissions are capable of causing significant problems for the operation of a vehicle. For example, if a vehicle system or microcontroller is altered to "spam" the CAN bus 100, or send a large number of unnecessary or meaningless messages through the CAN bus 100, it may prevent other valid and necessary messages from being transmitted, negatively impacting vehicle performance. In other cases, an internet-connected system 102 may provide a way to remotely access and alter a secure vehicle system 104, which is otherwise secure because it is connected only to the CAN bus 100. Moreover, a CAN bus 100 has limited bandwidth and is highly sensitive to disruptive communications, as even random data placed on a CAN bus 100 may cause significant damage to various connected systems.

In some embodiments, it may be necessary for secure vehicle systems 104 to communicate with some unsecured vehicle systems 102. Thus, complete separation of systems is not a viable solution. Instead, a better solution is to employ a "listen-only" configuration for internet-connected systems 102, whereby vehicle systems 102 with connections to the internet 114 may be prohibited from transmitting any information to the CAN bus 100 while still being permitted to receive messages from the CAN bus 100. Listen-only configurations can be created with software configured to prohibit a vehicle system 102 from sending transmit data to its CAN node 110, or to prohibit a microcontroller within a node 110 from sending transmit data to the associated transceiver. However, software solutions are generally inadequate because they may also be defeated or altered remotely. As will be described below with reference to FIG. 2, a listen-only hardware configuration may provide much more reliable security for a secure CAN bus 100 relative to a software-implemented listen-only mode.

Figure 2:
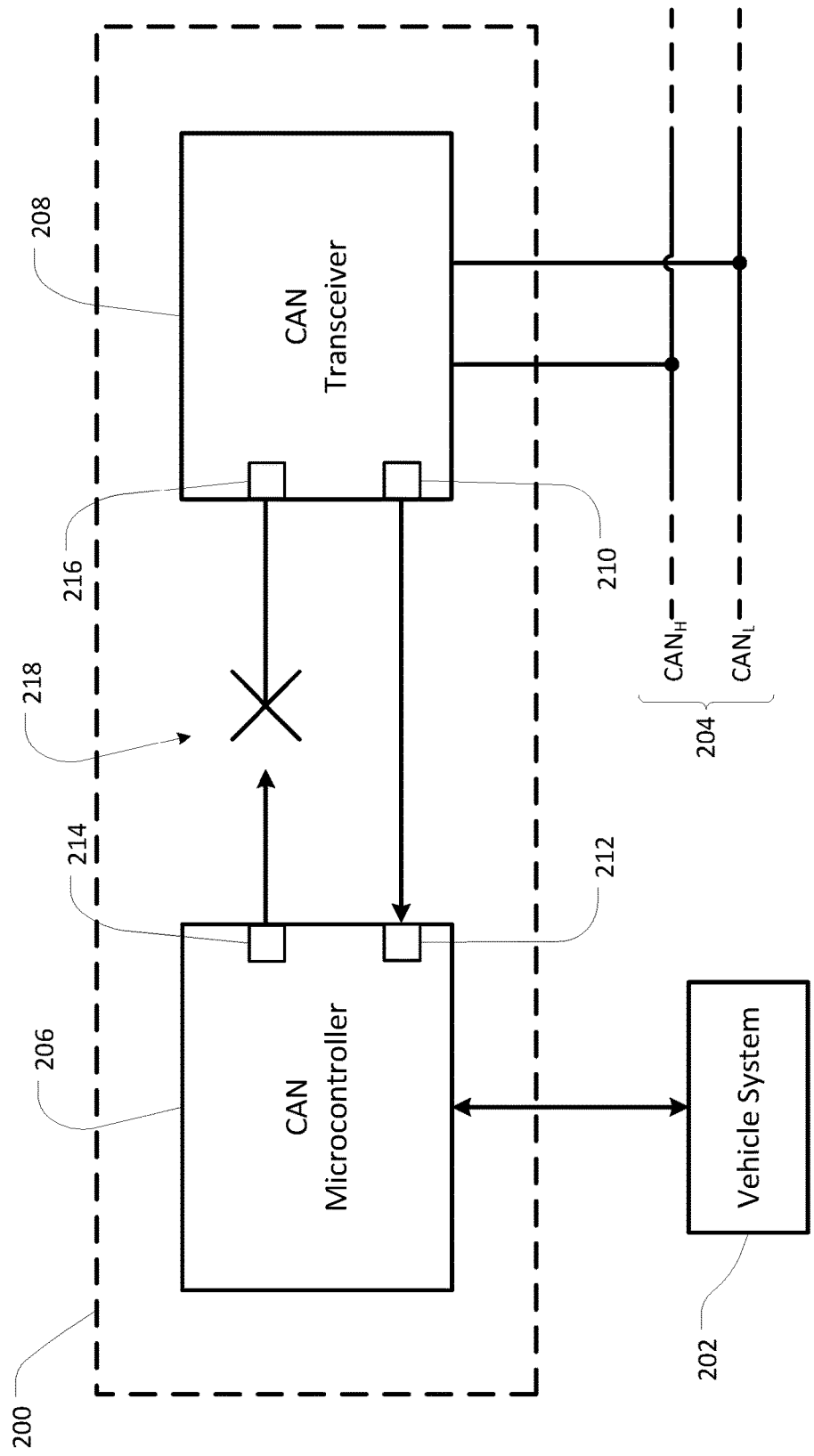
FIG. 2 is a block diagram depicting a CAN node in a listen only configuration integrated within a vehicle communication system in accordance with an exemplary embodiment.

FIG. 2 is a block diagram depicting a CAN node 200 in a listen-only configuration integrated within a vehicle communication system in accordance with an exemplary embodiment. A CAN node 200 may be configured to facilitate communication between a vehicle system 202 and a CAN bus 204. A CAN node 200 may include a microcontroller 206 and a transceiver 208. In some embodiments, a CAN node 200 may include at least one printed circuit board (PCB), which may make up at least a portion of the microcontroller 206 and/or transceiver 208. A microcontroller 206 may communicate directly or indirectly with a vehicle system 202. Communications between a microcontroller 206 and a vehicle system 202 may include transmit data being sent from the vehicle system 202 to be transmitted to a CAN bus 204, as well as received data from the CAN bus 204 being sent from the microcontroller 206 to the vehicle system 202. The CAN transceiver 208 may be communicate with the CAN bus 204. In some embodiments, the CAN transceiver 208 may be configured to transmit data received from the microcontroller 206 directly to the CAN bus 204, as well as to transmit data received from the CAN bus 204 directly to the microcontroller 206. A CAN transceiver 208 may further be configured to convert received data from the CAN bus 204 to a level or format compatible with the microcontroller 206 and/or to convert received data from the microcontroller 206 to a level or format compatible with the CAN bus 204.

Within the CAN node 200, the microcontroller 206 and the transceiver 208 may be configured to communicate directly or indirectly with each other. In some embodiments, a CAN microcontroller 206 may include a transmit data output 214 and a receive data input 212. In some embodiments, a CAN transceiver 208 may include a transmit data input 216 and a receive data output 210. Receive data received from the CAN bus 204 at the transceiver 208 may thus be sent to the microcontroller 206 through an electrical connection between a receive data output 210 of the transceiver 208 and a receive data input 212 of the microcontroller 206. Similarly, transmit data to be sent to the CAN bus 204 from the microcontroller 206 may be sent to the transceiver 208 through an electrical connection between a transmit data output 214 of the microcontroller 206 and a transmit data input 216 of the transceiver 208. In some embodiments, the outputs 210, 214 and inputs 212, 216 described above may include any type of physical electrical connection, such as a metallic pin, post, plug and socket connector, terminal block, a pad of a PCB, a wire, or any other structure capable of serving as an electrical connector between electrical components.

In some embodiments, a listen-only configuration for a vehicle system 202 may be implemented physically by means of a hardware separation 218 between the microcontroller 206 and the transceiver 208. A hardware separation between two elements means that there is no conductive path for electrons to flow between the elements. A hardware separation 218 may be more effective than a listen-only mode of software in the microcontroller 206, transceiver 208, or vehicle system 202 because it may completely prohibit messages from being received at the receiver 208 and sent to the CAN bus 204 even if they are sent as a result of a software error or an intentional attack on software safeguards.

A hardware separation 218 may be added to a CAN node 200 in any of various physical implementations. In some embodiments, the hardware separation 218 may occur at or within a microcontroller 206, a transceiver 208, and/or an electrical connector between the microcontroller 206 and the transceiver 208, as well as at any interface between a microcontroller 206, transceiver 208, and/or electrical connector. In some embodiments, the hardware separation 218 may be in the form of a pin being physically removed from a connector plug and/or a wire being cut within the CAN node circuitry. In some embodiments, a connector plug may be manufactured without a transmit data pin or with the transmit data connection otherwise severed so that a listen-only hardware configuration may be employed without having to remove any electrical circuitry. In embodiments in which the microcontroller 206 and/or the transceiver 208 include at least one PCB, the hardware separation 218 may include circuitry elements such as a removable jumper, a jumper not being populated, a pad or signal trace unconnected from other circuitry of the PCB, or any other PCB element configured and/or shaped so as to separate a transmit data output 214 of the microcontroller 206 from any input of the transceiver 208. In some embodiments, separating a transmit data output 214 and a transmit data input 216 via hardware may be performed by altering commercially available circuitry to remove a connection, or may be performed by manufacturing custom circuitry configured with unconnected, disconnected, or missing elements that are normally provided for CAN node data transmission on the CAN bus.

Referring now to both FIGS. 1 and 2, one or more CAN nodes 200 with hardware separation 218 may be used selectively and connected through a CAN bus with other nodes 112 that do not have a hardware separation 218, so that secure and unsecure vehicle systems may safely be connected by a single CAN bus 100. In some embodiments, some degree of communication may be necessary between secured vehicle systems 104 and unsecured vehicle systems 102. For example, one unsecured vehicle system 102 may be a dashboard infotainment unit, whose functions may include navigation as well as engine status or performance notifications. To provide navigation functions, the infotainment unit 102 may require a connection to the internet 114, making the infotainment unit 102 an unsecure system. To provide engine status or performance notifications, the infotainment unit 102 may require an input of information from a secured vehicle system 104, such as an ECU, delivered via a powertrain CAN bus 100. In this situation, the infotainment system 102 may be connected to the powertrain CAN bus 100 with a hardware-separated CAN node 200, 110, because it only needs to receive information from the powertrain CAN bus 100 to operate. The ECU 104 may be connected to the powertrain CAN bus 100 with a non-hardware-separated CAN node 112, because it needs to transmit information onto the powertrain CAN bus 100 and receive information in order for the system to operate as intended. Thus, this configuration allows the infotainment system 102 to receive the required ECU data, while safely maintaining the security of the CAN bus 100 and ECU 104 from undesired outside access.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected). The presence in some instances of broadening words and phrases such as 'one or more', 'at least', 'but not limited to', or other like phrases shall not be read to mean that the narrower case is intended or required in instances where such broadening phrases may be absent.

Those of skill in the art would understand that information and signals may be represented using any of a variety of different technologies and techniques. For example, data, instructions, commands, information, signals, transmissions, and messages that may be referenced throughout the above description may be represented by voltages, currents, electromagnetic waves, magnetic fields or particles, optical fields or particles, or any combination thereof.

Those of skill would further appreciate that any of the various illustrative logical blocks, modules, cores, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The previous description of the disclosed implementations is provided to enable any person skilled in the art to make or use the present disclosed process and system. Various modifications to these implementations will be readily apparent to those skilled in the art, and the generic principles defined herein may be applied to other implementations without departing from the spirit or scope of the disclosed process and system. Thus, the present disclosed process and system is not intended to be limited to the implementations shown herein but is to be accorded the widest scope consistent with the principles and novel features disclosed herein.

What is claimed is:

1. A system for listen-only communication between a vehicle system and a communication bus, the system comprising:
    a listen-only controller area network (CAN) node in communication with the vehicle system and the communication bus, the listen-only CAN node comprising:
    a microcontroller; and
    a transceiver configured to send data to the communication bus, receive data from the communication bus, and send data received from the communication bus to the microcontroller;
    wherein the listen-only CAN node implements a listen-only configuration, such that the vehicle system is prohibited from transmitting information to the communication bus, by including a hardware separation comprising a CAN bus connector plug that does not include a transmit data pin, the hardware separation configured to prevent the microcontroller from transmitting data to the transceiver.

2. The system of claim 1, wherein the communication bus is a CAN bus.

3. The system of claim 1, further comprising a differential pair for communication with the communication bus.

4. The system of claim 1, wherein the system comprises at least one printed circuit board (PCB).

5. The system of claim 4, wherein the at least one PCB comprises at least one signal trace, and the hardware separation comprises a removable jumper unconnected from a signal trace of the at least one PCB.

6. The system of claim 4, wherein the at least one PCB comprises at least one pad, and the hardware separation comprises a pad of the at least one PCB unconnected from other circuitry of the at least one PCB.

7. The system of claim 1, wherein the hardware separation is disposed at or within the microcontroller.

8. The system of claim 1, wherein the hardware separation is disposed at or within the transceiver.

9. A method for establishing communication between a vehicle system and a communication bus, the method comprising:

providing a microcontroller;
providing a transceiver configured to send transmit data to the communication bus, receive data from the communication bus, and send data received from the communication bus to the microcontroller; and
separating, via hardware, the transmit data input of the transceiver from an output of the microcontroller to prevent the microcontroller from transmitting data to the transceiver, wherein the separating comprises configuring a printed circuit board (PCB) or electrical connector to prevent the delivery of data from an output of the microcontroller to the transmit data input of the transceiver such that the vehicle system has a listen-only configuration with respect to the communication bus.

10. The method of claim 9, wherein the communication bus is a controller area network (CAN) bus.

11. The method of claim 9, wherein the separating via hardware occurs at or within the microcontroller.

12. The method of claim 9, wherein the separating via hardware occurs at or within the transceiver.

13. The method of claim 9, wherein the separating via hardware comprises disconnecting and/or removing a pin of an electrical connector from other circuitry.

14. The method of claim 9, wherein the separating via hardware comprises manufacturing a PCB or electrical connector configured to prevent the delivery of data from an output of the microcontroller to the transmit data input of the transceiver.

15. A vehicle, the vehicle comprising:
a controller area network (CAN) bus; and
a plurality of CAN nodes, each CAN node associated with one of a plurality of vehicle systems and comprising:
a microcontroller; and
a transceiver configured to communicate with the microcontroller;
wherein the plurality of vehicle systems includes:
a secure first vehicle system; and
a second vehicle system having a listen-only configuration, wherein the CAN node associated with the second vehicle system implements the listen-only configuration by including a hardware separation between an output of the microcontroller and a transmit data input of the transceiver, the hardware separation comprising a CAN bus connector plug that does not include a transmit data pin.

16. The vehicle of claim 15, wherein at least one of the plurality of CAN nodes comprises at least one printed circuit board (PCB).

17. The vehicle of claim 16, wherein the at least one PCB comprises at least one signal trace, and the hardware separation comprises a removable jumper unconnected from a signal trace of the at least one PCB.

18. The vehicle of claim 16, wherein the at least one PCB comprises at least one pad, and the hardware separation comprises a pad of the at least one PCB unconnected from other circuitry of the at least one PCB.

19. The vehicle of claim 15, wherein the hardware separation is disposed at or within the microcontroller.

20. The vehicle of claim 15, wherein the hardware separation is disposed at or within the transceiver.

* * * * *